United States Patent [19]
Marlot et al.

[11] Patent Number: 6,102,314
[45] Date of Patent: Aug. 15, 2000

[54] FISHING REEL WITH BAIL ARM

[75] Inventors: Jean-Baptiste Marlot, Scionzier; Alain Plestan, Marignier, both of France

[73] Assignee: Mitchell Sports, Marignier, France

[21] Appl. No.: 09/038,488

[22] Filed: Mar. 6, 1998

[30] Foreign Application Priority Data

Mar. 6, 1997 [FR] France .................................. 9702899

[51] Int. Cl.⁷ .................................................. A01K 89/01
[52] U.S. Cl. ......................... 242/231; 242/232; 242/311; D22/141
[58] Field of Search .................................. 242/231, 232, 242/311; D22/141

[56] References Cited

U.S. PATENT DOCUMENTS

| | | |
|---|---|---|
| D. 352,764 | 11/1994 | Onishi . |
| D. 374,908 | 10/1996 | Koelewyn . |
| 4,778,124 | 10/1988 | Shinohara . |
| 5,312,067 | 5/1994 | Sugawara et al. ........................ 242/232 |
| 5,513,813 | 5/1996 | Bernard et al. . |
| 5,573,193 | 12/1996 | Bernard et al. . |
| 5,605,298 | 2/1997 | Shimozaki et al. ...................... 242/231 |
| 5,673,867 | 10/1997 | Takeuchi ................................. 242/231 |
| 5,845,858 | 12/1998 | Amano et al. ........................... 242/231 |

FOREIGN PATENT DOCUMENTS

| | | |
|---|---|---|
| 2 709 922 | of 0000 | France . |
| 2 710 238 | of 0000 | France . |
| 17 57 534 | 2/1972 | Germany . |
| 8-172984 | 7/1996 | Japan . |
| 2 282 040 | 3/1995 | United Kingdom . |

*Primary Examiner*—Donald P. Walsh
*Attorney, Agent, or Firm*—Foley & Lardner

[57] ABSTRACT

A fishing reel front section includes a support shaft extending along an axis and configured for reciprocal movement along the axis, a spool supported by the support shaft and a drum rotatably supported about the spool. The spool includes a peripheral groove configured to store fishing line, a front flange on a first side of the groove, a rear flange on a second opposite side of the groove and a rear skirt extending from the rear flange and terminating at a rear edge. The drum includes a body, first and second diametrically opposed retrieval arms extending forward from the body and a bail arm coupled to ends of the first and second retrieval arms. Each retrieval arm has a base proximate the body and an opposite end. The first and second retrieval arms define a fishing line retrieval side and a fishing line casting side on opposite sides of a plane parallel to the axis and intersecting the first and second retrieval arms. The first bail arm moves between a retrieval position in which the first bail arm extends on the retrieval side so as to wind fishing line on the spool and a casting position in which the first bail arm extends on the casting side so as to permit fishing line to be released. The fishing reel front section further includes a surface extending between the first and second retrieval arms on the line retrieval side. At least a portion of the surface extends forward the rear edge of the spool. The one exemplary embodiment, a fishing reel front section includes a second bail arm between the first and second retrieval arms. The second bail arm has a forward edge providing the surface and an opposite rear edge spaced from the body.

24 Claims, 3 Drawing Sheets

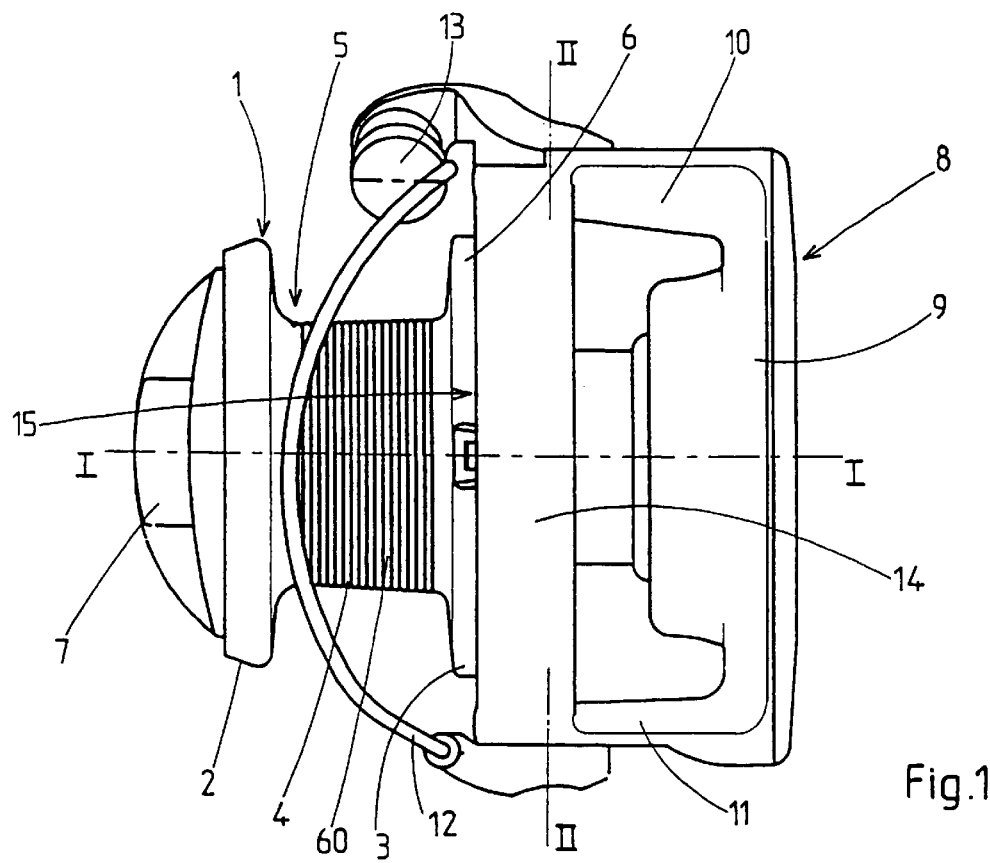
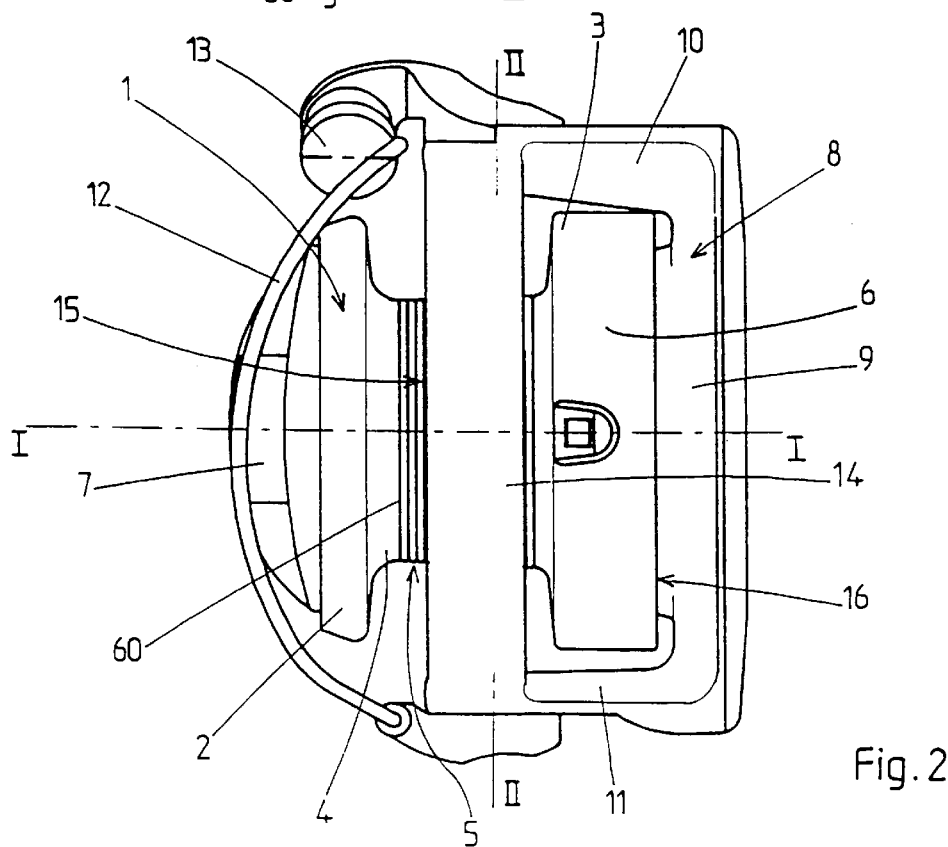

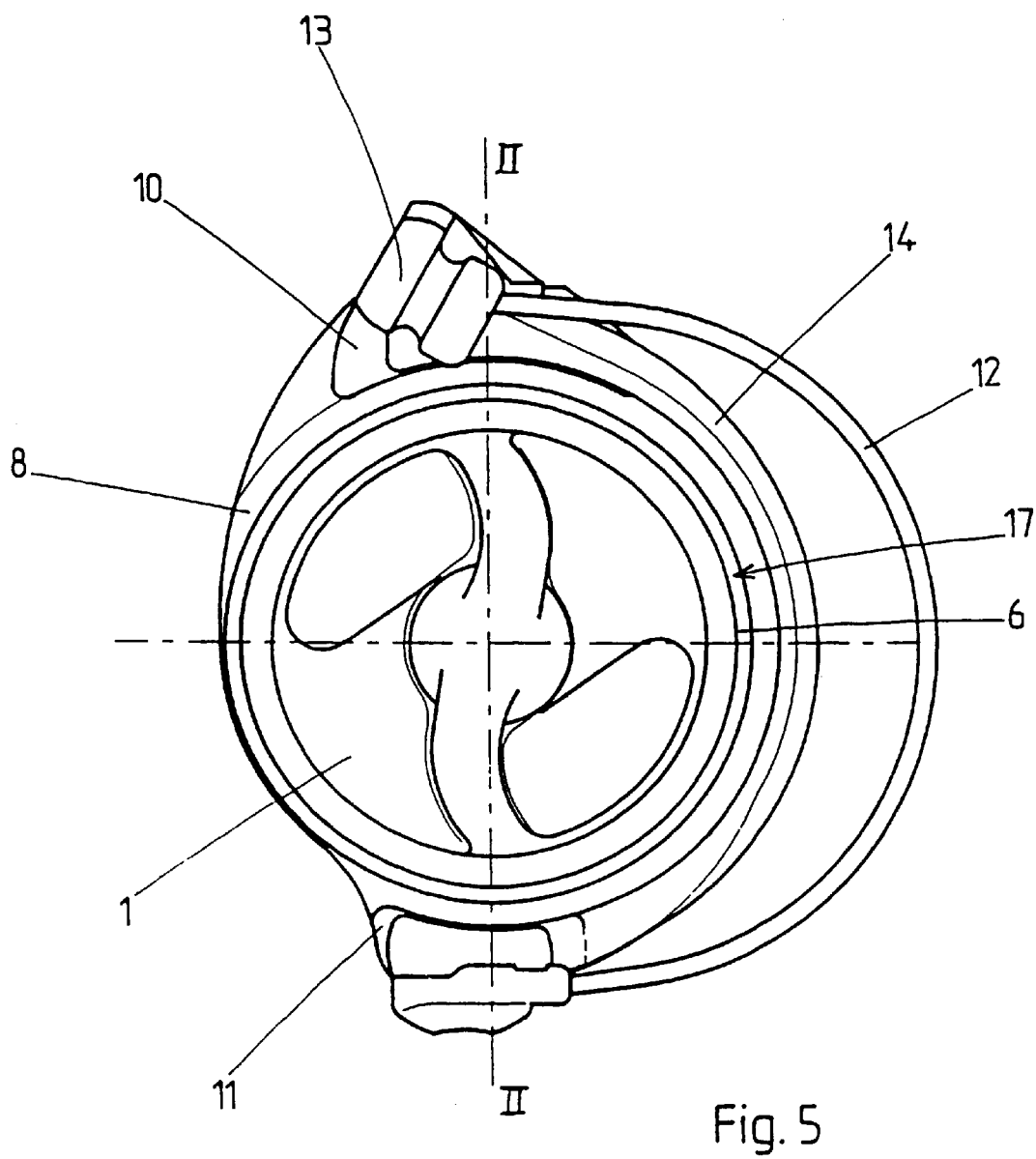

FISHING REEL WITH BAIL ARM

This invention pertains to fishing reels with a fixed spool and a line retrieval.

Inside this type of reel a spool is held on a support shaft of which the rear section is contained in the reel body. The spool is a rotary part formed with a front and a rear flange that are radially positioned and are connected through a cylindrical hub of a smaller diameter that is positioned on the same axis between both flanges and forms a peripheral groove used for storing the fishing line. A crank handle and a mechanical gear device engage the spool support shaft in an alternate longitudinal movement. A pick up drum carrying a retractable bail arm is mounted in rotation on the reel body and is engaged in rotation with the crank handle and the mechanical gear device.

We know two kinds of fishing reels with a fixed spool and a line retrieval, reels with an enveloped spool and reels with an enveloping spool.

Reels with an enveloped spool, such as the ones described in document FR-A-Z 709 922 for example, have a spool that slides in a hollow cylindrical housing secured in the pick up drum. In this case there is a risk of the fishing line going between the pick up drum and the rear flange of the spool. If this situation happens, the line may be partially wound around the support shaft of the spool in the rear of the spool and could be damaged and cause the reel to malfunction if the reel requires disassembly to clear the line. In the document mentioned above we prevent this inconvenience by placing a ring in rotation in the ring shaped groove of the spool rear flange that slides with play in the pick up drum. A similar solution is described in document U.S. Pat. No. 4,778,124, with rollers that slide along the retrieval arms and roll on the spool rear flange to prevent the fishing line from reversing. These dragging devices create friction between the pick up drum and the spool that creates more noise, causes wear and increases the cost of the reel.

The spool inside reels with an enveloping spool comprises a rear flange with a skirt enveloping a cylindrical section inside the pick up drum. The enveloping rear skirt considerably reduces the risk of the fishing line getting between the pick up drum and the spool. But this type of structure also decreases the usable diameter of the spool in comparison with the total diameter of the reel, increases the length of the reel and creates more mechanical stress on the line by the smaller diameter of the spool.

This invention suggests a new structure for the fishing reel that simultaneously offers the advantages of more compactness and less mechanical stress on the fishing line by using a spool with a short skirt, and eliminates the risk of the line getting between the pick up drum and the flange or the spool rear skirt, with low cost, no friction and no wear.

The idea behind this invention is to design a reel with an enveloping spool in which the length of the spool rear skirt may be shorten to its minimum, while effectively preventing a loop from the line getting behind the spool skirt at the beginning of the step when the line is retrieved.

To reach these goals and others, the fishing reel comprises, according to the invention:
a spool with a peripheral groove for storing the line, surrounded by a front and a rear flange, and held on a support shaft of which the rear section is contained in the reel body and is engaged in an alternate longitudinal movement by a crank handle and a mechanical gear device,
a pick up drum with a retractable bail arm that is articulated at the end of two opposite lateral retrieval arms, mounted in rotation on the reel body and engaged in rotation around the support shaft by a crank handle and a mechanical gear device, the spool comprises a rear skirt, extending from the rear flange,
the pick up drum additionally comprises a bail arm that connects one retrieval arm to the other depending on the half circumference taken up by the retractable bail arm at the step when the line is retrieved, with at least part of the rear edge of the bail arm permanently positioned in front of the rear edge of the spool.

Preferably, the bail arm follows the external peripheral surface of the spool rear skirt with little radial play.

According to a first method of implementation, the bail arm is an arc of a circle and its rear edge is at the level of the rear ends of the retrieval arms.

According to a second method of implementation, the bail arm is an arc of a helix having the first rear end connected to the rear end of the first retrieval arm holding a roller for line retrieval, and with a second rear end connected to the second retrieval arm in an intermediate rearward position.

In both cases, the bail arm is preferably fixed and interdependent with the retrieval arms. As an example, the bail arm and the retrieval arms are molded in one piece to form a cast as a one piece assembly.

Other purposes, characteristics and advantages of this invention will be presented in the following description of special methods of implementation given in relation with the appended figures, in which:

FIG. 1 is a side view that illustrates the front section of the reel according to the invention, in which we distinguish the pick up drum and the spool, the spool being in a forward position;

FIG. 2 is a view that illustrates the front section of the reel in FIG. 1, with the spool in a rearward position;

FIG. 5 is a front view that illustrates the front section of the reel in FIGS. 1 or 3.

Figure 3:
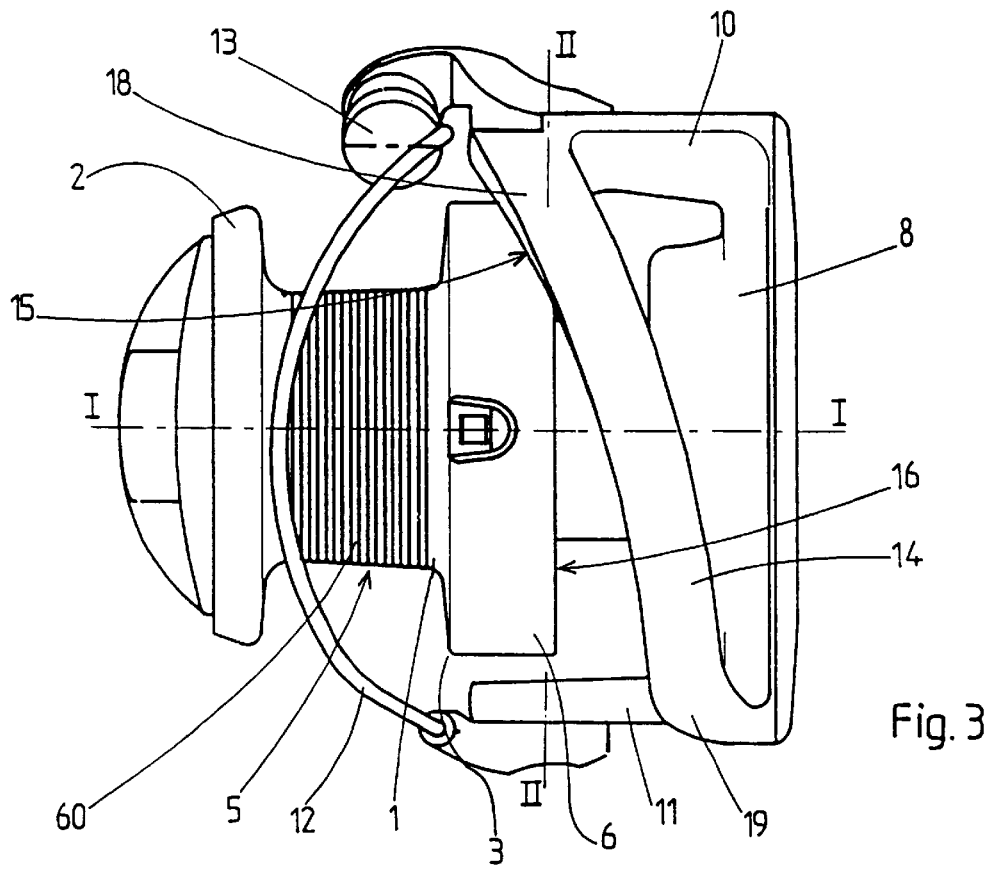
FIG. 3 is a view that illustrates the front section of a reel according to a second method of implementation of this invention, with the spool in a forward position.

As represented in the figures, the reel according to the invention comprises a spool (1) adapted at the front end of a support arm expanding in the front-rear direction I—I of the reel in which the rear section is contained in a reel body that is not represented in the figures. The spool (1) and its support shaft are engaged in an alternate longitudinal movement, between a forward position illustrated in FIG. 1 and a rearward position illustrated in FIG. 2, by a crank handle and a mechanical gear device, a standard gear device, for example, like the one illustrated in document U.S. Pat. No. 4,778,124 and usually used in fishing reels with a fixed spool and a line retrieval.

The spool (1) generally comprises a front flange (2) and a rear flange (3) with a cylindrical hub of a smaller diameter mounted in between on their axes to form a peripheral groove (5) that holds the fishing line (60). The rear flange (3) expands rearward with a rear skirt (6).

The spool (1) is mounted in rotation in a standard manner on the support shaft and comprises an internal locking mechanism of the type with a flexible latch engaged in an ring shaped groove of the support shaft and engaged by a push-button (7).

The front section of the reel according to the invention in addition comprises, a pick up drum (8), formed with a drum body (9) adapted to be mounted in rotation on the body of the reel and to be engaged in rotation in a standard manner by the crank and the mechanical gear device. The pick up drum (8) in addition comprises two longitudinal arms that are diametrically opposed, with a first retrieval arm (10) and a second retrieval arm (11) of which the front ends are connected to the body (9), and the rear ends are free and placed on both sides of the spool (1). The pick up drum (8) has a retractable bail arm (12) that is articulated at the end of both lateral retrieval arms (10) and (11).

In operation, the retractable bail arm (12) can take two positions, a retrieval position that is illustrated in FIGS. 1 through 5 for bringing the fishing line (60) back and winding it up on the spool (1), and a casting position for which the retractable bail arm (12) is retracted from rotation around a transverse axis II—II to get to the opposite side of the spool (1) in relation to the side that is illustrated in FIGS. 1 though 5.

With this invention, the reel has a retractable bail arm (12) that can be a standard part, and may preferably be combined with a roller (13) that is mounted in rotation at the front end of the first line retrieval arm. During use, in the retrieval position that is illustrated in the figures, the fishing line (60) comes to slide on the retractable bail arm (12) and is engaged on the roller (13) while sliding lengthwise by turning the roller (13) to wind onto the spool (1) when the pick up drum (8) is in rotation.

According to the invention, as illustrated in the figures, the pick up drum (8) in addition comprises a bail arm (14), connecting both retrieval arms (10) and (11) according to the half-circumference taken by the retractable bail arm (12) at the step when the line is retrieved. The front edge (15) of the bail arm (14) is permanently in front of the rear edge (16) of the spool, as is illustrated in FIGS. 1 and 2.

As a result of this arrangement, in the casting position, when the retractable bail arm (12) is retracted away from the spool (1), the line (60) is blocked in its movement rearwards either by the retractable bail arm (12) according to half a circumference of the spool, or by the bail arm (14) on the second half-circumference of the spool (1), thus preventing the line (60) from falling between the spool (1) and the retrieval arms (10) and (11).

We can see the front view in FIG. 5 that illustrates that the bail arm (14) follows with a slight radial play the external peripheral surface (17) of the rear skirt (6) of the spool.

In the first method of implementation illustrated in FIGS. 1 and 2, the bail arm (14) is an arc of a circle and its front edge (15) is at the level of the front ends of the retrieval arms (10) and (11). In this case, the entire front edge (15) of the bail arm (14) is permanently in front of the rear edge (16) of the spool (1).

Figure 4:
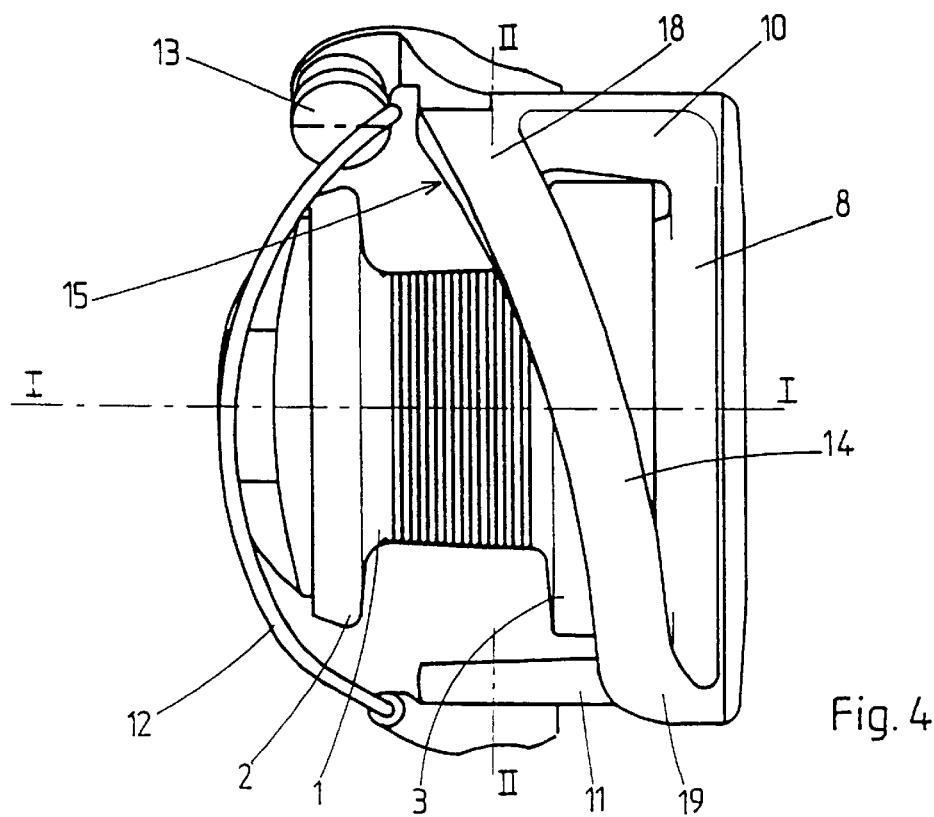
FIG. 4 is a side view that illustrates the front section of the reel in FIG. 3, with the reel in a rearward position.

In the second mode of implementation shown in FIGS. 3 and 4 the bail arm (14) is an arc of a helix having the first front end (18) connected to the front end of the first retrieval arm (10) holding a roller (13) for line retrieval, and with the second rear end (19) connected to the second retrieval arm (11) in a intermediate rearward position, for example at the rear base of the second retrieval arm (11). In this case, the front edge (15) of the part of the bail arm (14) that is near its first front end (18) is permanently in front of the rear edge (16) of the spool (1). The helix shape of the bail arm (14) brings the line back toward the roller (13) during rotation of the pick up drum (8).

In both methods of implementation the bail arm (14) is fixed, interdependent with the retrieval arms (10) and (11).

In the implementations illustrated in the figures, the bail arm (14) and the retrieval arms (10) and (11) are molded in one piece to form a cast in one piece assembly with the pick up body (9).

The special arrangement in the invention, with a bail arm (14), substantially reduces the risk of the fishing line (60) going behind the spool (1), and therefore ensures the use of a spool (1) of which the rear skirt (6) is short. Therefore, we shorten the length of the reel.

To again reduce the risk of the line getting in the rear of the spool (1), the retractable bail arm (12) can preferably include a tightening and a line guide device on the roller (13), for example a device such as the one described in document FR-A-2 710 238.

This invention is not limited to the methods of implementation that have been explicitly described, but it includes the differing variants and generic applications contained in the following claims.

We claim:

1. A fishing reel front section comprising:
    a support shaft extending along an axis and configured for reciprocal movement along the axis;
    a spool supported by the support shaft, the spool including:
       a peripheral groove configured to store fishing line;
       a front flange on a first side of the groove;
       a rear flange on a second opposite side of the groove; and
       a rear skirt extending from the rear flange and terminating at a rear edge; and
    a drum rotably supported about the spool, the drum including:
       a body;
       first and second diametrically opposed retrieval arms extending forward from the body, each retrieval arm having a base proximate the body and an opposite end, wherein the first and second retrieval arms define a fishing line retrieval side and a fishing line casting side on opposite sides of a plane parallel to the axis and intersecting the first and second retrieval arms;
       a first bail arm pivotably coupled to the ends of the first and second retrieval arms, wherein the first bail arm moves between a retrieval position in which the first bail arm extends on the retrieval side so as to wind fishing line on the spool and a casting position in which the first bail arm extends on the casting side so as to permit fishing line to be released; and
       a surface extending between the first and second retrieval arms on the line retrieval side, wherein at least a portion of the surface extends forward the rear edge of the spool.

2. The fishing reel front section of claim 1 including:
    a second bail arm extending between the first and second retrieval arms, wherein the second bail arm has a forward edge providing the surface and an opposite rear edge spaced from the body.

3. The fishing reel front section of claim 2 wherein the forward edge extends from the end of the first retrieval arm to the end of the second retrieval arm.

4. The fishing reel front section of claim 3 wherein the second bail arm extends in an arc of a circle.

5. The fishing reel front section of claim 2 wherein the forward edge extends from the end of the first retrieval arm towards the base of the second retrieval arm.

6. The fishing reel front section of claim 5 wherein the second bail arm extends in an arc of a helix.

7. The fishing reel front section of claim 1 wherein the surface extends from the first retrieval arm to the second retrieval arm.

8. The fishing reel front section of claim 1 wherein the skirt has an external peripheral surface and wherein the arm follows the external peripheral surface with little radial play.

9. The fishing reel front section of claim 1 wherein the second bail arm is fixed, interdependent with the first and second retrieval arms.

10. The fishing reel front section of claim 1 wherein the second bail arm and the first and second retrieval arms are formed as part of a single integral unitary body.

11. The fishing reel front section of claim 1 including a roller proximate the end of the first retrieval arm.

12. The fishing reel front section of claim 11 wherein the surface extends from the end of the first retrieval arm towards the base of the second retrieval arm.

13. The fishing reel front section of claim 11 wherein the surface extends from the end of the first retrieval arm to the end of the second retrieval arm.

14. A rotor assembly for a fishing reel, the rotor assembly comprising:

a drum body;

a first retrieval arm extending forward from the body and including a first retrieval arm end distant the body;

a second retrieval arm extending forward from the body opposite the first retrieval arm and including a second retrieval arm end distant to the body;

a first bail arm extending between the first and second support arms, wherein the first bail arm includes a first end portion proximate to the first retrieval arm; and a second bail arm pivotably coupled to the first and second retrieval arms for movement between a line retrieval position proximate the first bail arm and a casting position distant the first bail arm.

15. The rotor assembly of claim 14 wherein the first bail arm includes a second end portion proximate the second retrieval arm end.

16. The rotor assembly of claim 14 wherein the first bail arm includes a second end portion proximate the drum body.

17. The rotor assembly of claim 14 including a roller supported by the second bail arm proximate to the first end portion of the first bail arm.

18. The rotor assembly of claim 14 wherein the first retrieval arm, the second retrieval arm and the first bail arm are formed as a single integral unitary body.

19. The rotor assembly of claim 14 wherein the first retrieval arm and the second retrieval arm extend on opposite sides of an axis and wherein the second bail arm extends in a plane substantially perpendicular to the axis in the line retrieval position.

20. A rotor assembly for a fishing reel, the rotor assembly comprising:

a drum body;

a first retrieval arm extending forward from the body and including a first end distant the body;

a second retrieval arm extending forward from the body opposite the first retrieval arm and including a second end distant the body;

a surface extending between the first and second support arms, wherein the surface includes a first portion proximate the first end of the first retrieval arm; and a retractable bail arm pivotably coupled to the first and second retrieval arms for movement between a line retrieval position proximate the surface and a casting position distant the surface.

21. The rotor assembly of claim 20 wherein the surface includes a second portion proximate the second end of the second retrieval arm.

22. The rotor assembly of claim 20 wherein the surface includes a second portion proximate the body.

23. The rotor assembly of claim 20 wherein the surface is spaced from the body by an open cavity therebetween.

24. The rotor assembly of claim 20 wherein the first retrieval arm and the second retrieval arm extend on opposite sides of an axis and wherein the retractable bail arm extends in a plane substantially perpendicular to the axis when the retractable bail arm is in the line retrieval position.

* * * * *